Sept. 12, 1961  E. V. BARKOW  2,999,512
FLOW CONTROL VALVE
Filed Oct. 31, 1960

INVENTOR.
EUGENE V. BARKOW
BY Dudley B. Howard
Attorney

2,999,512
FLOW CONTROL VALVE
Eugene V. Barkow, 681 Morris Turnpike, Springfield, N.J.
Filed Oct. 31, 1960, Ser. No. 66,070
8 Claims. (Cl. 137—614.16)

The invention relates in general to valves and has particular reference to a special type of valve that allows free flow of fluid therethrough in one direction and adjustable variable flow in the opposite direction.

A typically useful application of my improved fluid control valve is in the operation of machine tools known as "shapers." A shaper has means to mount a cutting tool for reciprocation in alternate rectilinear cutting and return strokes in relation to a workpiece. In the cutting, or power, stroke, it is desirable to have the cutting tool move slowly, whereas, in the return stroke, speed is preferred.

In a shaper, the cutting tool is operated by power fluid in a piston-cylinder device. Valve mechanism causes the power fluid to exert power impulses alternately in opposite directions on the piston, which in turn drives the cutting tool. My improved valve is interposed between a source of pressurized fluid and the cylinder in a manner to cause slow flow during each cutting, or power, stroke and rapid flow during the subsequent return stroke.

It, therefore, is the primary object of my invention to provide a fluid control valve by which the rate of flow of fluid at least in one direction, as in regulating the speed of the power stroke in a shaper, may be controlled with precision.

Another object is to provide a flow control valve in which the slow rate of flow may be controlled at a uniform degree of variation from full flow to shut-off condition.

I am aware that in the prior art attempts have been made to control the flow of fluids at different rates in opposite directions by the employment of needle valves, but these valves are likely to become clogged by deposits of solid matter carried in suspension in the fluid to be controlled, thus causing lack of precision in the degree of control. It, therefore, is a further important object of the invention to provide a valve structure in which the possibility of clogging is reduced.

It is also my object to provide a fluid control valve of extremely simple structure and possessing a minimum number of parts which are not likely to get out of order under the most exacting and prolonged conditions of use.

Still further objects, advantages and features of the invention will become apparent as the following specific description is read in connection with the accompanying drawings in which.

Figure 1:
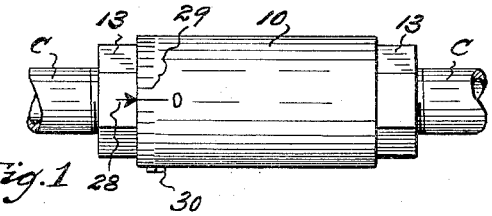
FIG. 1 is a side elevational view of the presently preferred embodiment of my improved flow control valve.
Figure 2:
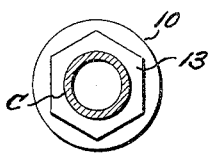
FIG. 2 is an end view of the same.

Referring now in detail to the drawings, wherein like reference characters designate corresponding parts in the several views, it will be observed that my improved flow control valve includes a cylindrical valve body 10 which has tubular end portions separated by a cross wall 11 having an axial through bore 12 of circular cross-sectional configuration that is arranged eccentrically with respect to the longitudinal axis of said valve body. A pair of tubular coupling plugs 13—13 are provided to fit rotatably in the respective end portions of valve body 10. These coupling plugs 13—13 preferably are identical in construction and are shown as being internally screw-threaded at their outer ends for coupling to the respective ends of tubular conduits c—c having communication with a fluid line in which a fluid, such as the power fluid of a shaper cylinder (not shown), is caused to flow alternately in opposite directions.

In order to secure each coupling plug 13 in its rotary engagement with one end portion of valve body 10, an annular locking groove 14 is provided in the periphery of said plug and a roll-pin 15 is driven into a tangential hole 16 in said valve body for engagement with locking groove 14.

The juncture between each coupling plug 13 and the corresponding end portion of valve body 10 is rendered fluid-tight by providing a second sealing groove 17 in the periphery of said coupling plug and installing a radially compressed sealing ring 18 of suitable elastic material, such as Teflon or rubber, in said groove 17.

When the coupling plugs 13—13 of the fluid control valve are tightly coupled to the separated ends of conduit c—c, the said plugs will be held stationary. Consequently, valve body 10 will be swiveled by coupling plugs 13—13 for manual rotary adjustment about its longitudinal axis in regulating the relative positions of cooperative valve members which will be described presently.

One coupling plug 13 is provided at its inner end with a circumferential lip 19 and a circular metering disk 20 is affixed by suitable process, such as brazing, to said lip so as to lie in a plane at right angles to the longitudinal axis of valve body 10 in closing relation to the interior passage of the said coupling plug. Metering disk 20 has an orifice 21 therein of marginal configuration which may be varied to suit specific applications. However, in FIGS. 5, 6 and 7 there is illustrated an orifice 21 of shape and relative edge dimensions designed to afford a maximum degree of precise variation in cross-sectional area throughout the possible angular adjustment of valve body 10 on its swivel axis, as will be explained more fully later herein.

A cup-shaped poppet valve member 22, which includes a circular end wall 23 and a cylindrical side wall 24 having a circular row of radial perforations 25 adjacent to said end wall, is mounted for axial reciprocation in through bore 12 of cross wall 11 of valve body 10 between a first terminal position in which its end wall 23 is in even rubbing contact with metering disk 20 and a second terminal position in which end wall 23 is spaced radially from said metering disk. A compression spring 26 fitted inside poppet valve member 22 serves to bias the latter into its first terminal position. A by-pass chamber 27 is provided in valve body 10 between cross wall 11 and metering disk 20 in communication with radial perforations 25 of poppet valve member 22.

Figure 5:
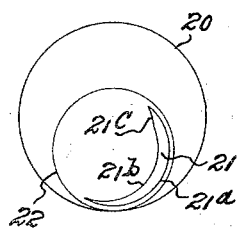
FIG. 5 is a diagrammatic view of the metering disk and poppet valve in a position of adjustment of the latter with relation to the orifice of the former in which the fluid flow is completely shut-off.
Figure 6:
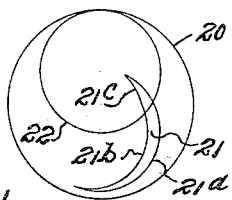
FIG. 6 is a similar view showing flow partially opened.
Figure 7:
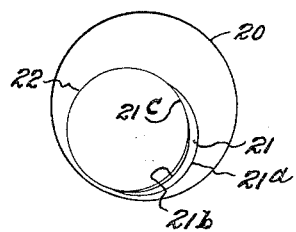
FIG. 7 is a similar view showing free flow at maximum rate.

The orifice shown in FIGS. 5, 6 and 7 has been developed to control the alternate slow-speed cutting stroke and high-speed return stroke of a shaper and will be used to demonstrate the cooperative relation of the movable and stationary valve elements of my improved flow control valve, the movable element being poppet valve member 22 and the stationary element being orifice 21 of metering disk 20.

Because of the eccentric relation of axial through bore 12 in cross wall 11 of valve body 10, poppet valve member 22 will be adjustable in an eccentric path of movement inside said valve body. Similarly, orifice 21 of metering disk 20 is located in an eccentric position in said metering disk in order that said orifice will be covered completely in the adjusted position of poppet valve member 22 represented in FIG. 5. Orifice 21 preferably is substantially crescent-shaped, although it is three-sided for functional reasons. There are two long marginal edges of orifice 21, viz. exteriorly facing convex edge 21a and interiorly facing concave edge 21b. At one end, or horn, of orifice 21, edges 21a and 21b converge in an extremely sharp point, whereas at the opposite end, or horn, edges 21a and 21b are connected by a short edge 21c lying in the arc of a circle which is equal in radius to poppet valve member 22 and will coincide with the periphery of said valve member when it is adjusted into the position shown in FIG. 7, which is one of maximum uncovered cross-sectional area in which the acute end, or horn, opposite to short edge 21c precisely coincides with the periphery of poppet valve member 22.

Orifice 21 also encompasses the center of metering disk 20 and the diameter of poppet valve member slightly exceeds the radius of metering disk 20. A further important relation is the curvature of the exteriorly facing edge 21a of orifice 21 which has a radius only slightly less than that of the periphery of poppet valve member 22, so that said edge 21a will be inwardly parallel to said periphery in the shut-off position of the valve elements represented in FIG. 5.

With this orifice and poppet valve member design, it is possible to utilize almost the full 360 degree rotation for adjusting the flow.

Figure 3:
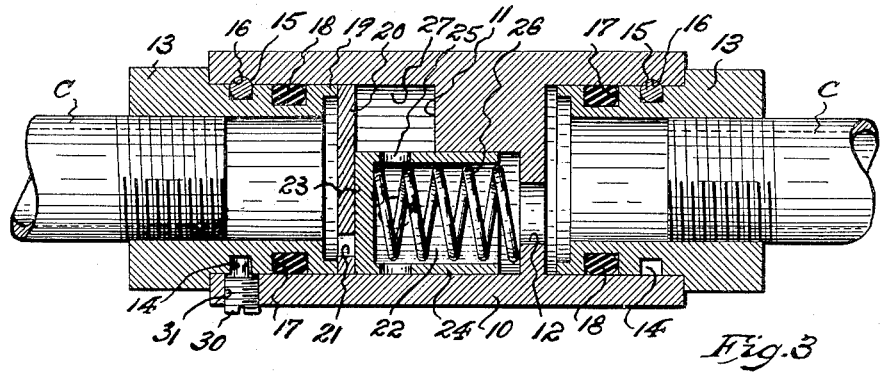
FIG. 3 is a longitudinal section, showing the poppet valve member seated against the metering disk in completely covering relation to the orifice therein, or shut-off condition.
Figure 4:
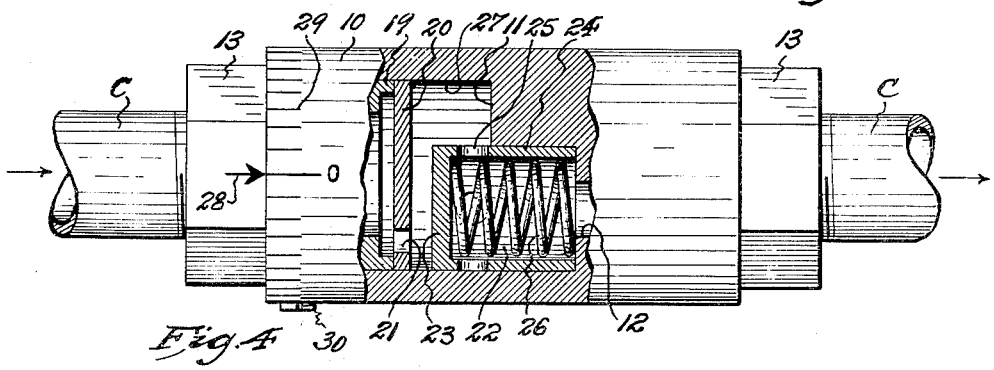
FIG. 4 is a side elevation, partly in longitudinal section, showing the poppet valve member unseated during free flow in the opposite direction.

As shown in FIGS. 1 and 4, one of the coupling plugs has an index point 28 delineated thereon for registration with the indicia of a circumferential scale of measurement 29 directly related to the adjusted position of poppet valve member 22 in relation to orifice 21 of metering disk 20. Consequently, an operator may adjust valve body 10 manually about its swivel axis to regulate the position of poppet valve member 22 in relation to orifice 21 of metering disk 20 to effect any desired relation between the fully covered shut-off position of FIG. 5 and the fully open position of FIG. 7. In this manner, the slow speed flow in a direction in which biasing spring 26 holds poppet valve member seated against metering disk 20 (FIG. 3) may be regulated with great precision. However, every time the direction of flow is reversed (FIG. 4), fluid pressure will move poppet valve member 22 away from metering disk 20 and will permit free flow throughout the full and unobstructed area of orifice 21 into chamber 27 and thence radially inward through perforations 25 to the interior of said poppet valve member and therethrough into the corresponding end of conduit c.

Although one of the main uses for a valve of the type I have invented is in the control of speed of an actuating cylinder, as in a shaper, in one direction only, two of these valves may be employed to control the speed in both directions. Adjusting the cylinder speed in one direction when two valves are used will not affect the cylinder speed in the opposite direction, as would happen if two adjustable orifices only were used.

In order to permit locking of valve body 10 in rotary adjusted relation to the coupling plug 13 which bears metering disk 20 after a desired flow rate has been effected, a locking screw 30 is engaged with a radial screw-threaded hole 31 in said valve body which registers with locking groove 14 of the said coupling plug 13. When screwed inward, locking screw 30 will come into frictional locking engagement with the bottom of groove 14.

Figure 8:
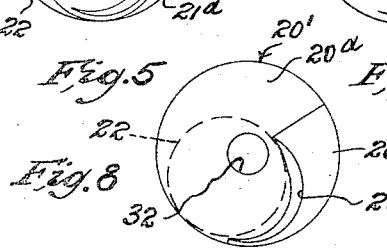
FIG. 8 is a similar view of a modified metering disk.

FIG. 8 discloses a modified form of metering disk 20' which is divided along radial lines at the extremities of crescent-shaped orifice 21' into separate segments 20a and 20b. This has been done to facilitate accurate formation of the acute ends or horns of orifice 21', it being very difficult to cut such acute ends in a single disk. A further modification resides in the provision of an auxiliary orifice 32 in metering disk 20' to insure free flow of fluid with minimum turbulence and deviation when poppet valve member 22 is displaced into the open position represented in FIG. 4. Auxiliary orifice 32 preferably is circular in shape and centrally located in metering disk 20'.

While the invention has been illustrated and described with respect to a particular embodiment thereof, it will be understood that it is intended to cover all changes and modifications of the embodiment shown which do not constitute departures from the spirit of the invention and scope of the appended claims.

I claim:

1. A flow control valve comprising: a cylindrical elongated valve body including tubular end portions separated by a cross wall having an eccentrically arranged axial through bore; a pair of axially aligned tubular coupling plugs each of which has fluid-tight swiveling engagement within one end portion of the valve body for fixed connection to the adjoining end of a fluid conduit through which fluid is caused to flow alternately in opposite directions, whereby the coupling plugs will remain stationary while the valve body may be manually rotated in its swiveled engagement with said plugs; a metering disk arranged at right angles to the axis of the valve body and being affixed to the inner end of one of the coupling plugs in fluid-tight connection therewith and having an orifice therein disposed eccentric to the axis of the valve body; a cup-shaped cylindrical poppet valve member including an imperforate end wall and a tubular side wall having radial perforations therein, said poppet valve member being mounted for limited reciprocation in the through bore of the cross wall of the valve body between a first terminal position contiguous to the metering disk and a second terminal position spaced therefrom and being arranged with its imperforate end wall facing the metering disk for even contact therewith in said first terminal position; and spring means biasing the poppet valve member into its said first terminal position, the cross wall of the valve body being spaced axially from the metering disk to provide a by-pass chamber in communication with the side wall perforations of the poppet valve member.

2. A flow control valve as defined in claim 1, wherein the orifice in the metering disk is substantially crescent-shaped in marginal outline.

3. A flow control valve as defined in claim 2, wherein the orifice in the metering disk is arranged in encompassing relation to the center of the metering disk.

4. A flow control valve as defined in claim 3, wherein the orifice in the metering disk is so arranged that, when the poppet valve is in a position to cover said orifice, the latter will be in encompassing relation to the axis of the poppet valve.

5. A flow control valve as defined in claim 4, wherein the orifice in the metering disk is three-edged and includes a short edge that is so arranged that in one position of the poppet valve the said short edge of the orifice will be closely parallel to the peripheral edge of said valve and the orifice will be completely uncovered and extend nearly to a second point of coincidence with the poppet valve periphery.

6. A flow control valve as defined in claim 5, wherein the metering disk is provided with an auxiliary free flow facilitating orifice located in a position wherein it is encompassed by the crescent-shaped orifice and the periphery of the poppet valve member, said auxiliary orifice being devoid of acute angles in its marginal outline.

7. A flow control valve as defined in claim 6, wherein the auxiliary free flow facilitating orifice is circular in marginal outline.

8. A flow control valve as defined in claim 7, wherein the auxiliary free flow facilitating orifice is centrally located in coaxial relation to the metering disk.

References Cited in the file of this patent

UNITED STATES PATENTS

| | | |
|---|---|---|
| 2,247,227 | Findley | June 24, 1941 |
| 2,886,065 | Hershman | May 12, 1959 |